United States Patent Office 3,188,226
Patented June 8, 1965

3,188,226
PROCESS FOR MAKING MOLDABLE MASONRY ARTICLES OF MANUFACTURE
Willem F. Jense, Amsterdam, Netherlands, assignor to Shell Oil Company, New York, N.Y., a corporation of Delaware
No Drawing. Filed June 22, 1962, Ser. No. 204,620
Claims priority, application Netherlands, Jan. 30, 1962, 274,172
10 Claims. (Cl. 117—5.3)

The present invention relates to an improved process for making mortar or masonry structures by means of casings, frames or molds by pretreating them with novel mold lubricants or coatings.

It is known that in the making of masonry structures such as concrete and various building elements, e.g. piles, lamp posts, sinks, stairways, window frames, kerbs, pipes, tiles, bricks, etc., use is made of casings or molds which may be made of various materials such as metal, wood and the like. In order to aid in release of the molded article from the mold, the mold is generally coated with an oleaginous coating material such as mineral or fatty oils or emulsions. Commercially available oils and emulsions have been found to be generally incapable of preventing the setting mix from sticking tightly to the sheeting, frame or mold. This has the drawback that after removal of the mold the adhering material has to be chipped from the sheeting, frame or mold, resulting in structures or articles of undesired surface finish. Also, removal of the structure under such conditions becomes time-consuming and involves damage to the molds. These drawbacks are also inherent in mechanical masonry work. If the mortar used then sticks to the matrix while setting, the joints in the wall section are damaged during removal and the mortar adhering to the matrix has to be removed later on. The advantages of mechanical masonry work as compared with manual masonry work are thus largely cancelled out.

It is an object of the present invention to provide an improved process for molding masonry-containing materials, which obviates the disadvantages of the prior art. It is another object of this invention to provide an improved process for coating moldable forms used in masonry work which achieves freedom from adherence and excellent surface finish and the preservation of the forms. Another object of this invention is to provide an oleaginous coating composition for moldable mortar-containing articles. These and other objects and advantages will become apparent as the invention is thoroughly described.

The foregoing and other objects are attained by a process of this invention which comprises pretreating the molds with an oleaginous composition which may be a liquid hydrocarbon such as hydrocarbon oil having a wide viscosity range of from 30 to 1000 SUS at 100° F. or an emulsion and having incorporated in such a base carrier from about 0.1% to about 10%, preferably from about 1% to about 6% by weight of a salt or amide of a mono- or dicarboxylic acid and of a polyamine, which salt or amide has a hydrocarbon group containing at least 8 carbon atoms.

The mono- or dicarboxylic acid used to make the salt or amide can be an aromatic mono- or discarboxylic acid, for instance benzoic acid, salicylic acid or the phthalic acids, or an aliphatic mono- or dicarboxylic acid, such as the saturated monocarboxylic acids, e.g. acetic acid, propionic acid and the homologues thereof, the saturated dicarboxylic acids such as oxalic acid, succinic acid, alkyl and alkenyl-succinic acid, glutaric acid and the homologues thereof, the unsaturated aliphatic monocarboxylic acids such as acrylic acid, methacrylic acid, crotonic acid, and their homologues, and the unsaturated dicarboxylic acids, such as maleic acid, fumaric acid, itaconic acid and their homologues.

Preferred are the salts or amides of aliphatic mono- or dicarboxylic acids and polyamines. Of these the amides derived from aliphatic monocarboxylic acids and polyamines are particularly suitable for purpose of this invention. Particularly suitable are the amides containing one or more amino groups, derived from an aliphatic monocarboxylic acid and a polyamine, which can also be used in the form of the salt of an aliphatic monocarboxylic acid.

Particularly suitable salts or amides of polyamines are the salts or amides derived from oleic acid, the tall oil acids obtained as a by-product in the manufacture of paper from wood, or the naphthenic acids produced in the refining of mineral oil with caustic soda.

Of the salts or amides derived from dicarboxylic acids the salts or amides of sebacic acid are preferred.

Any amine having at least two amino groups is suitable as the polyamine from which the salts or amides are formed. The amino-nitrogen atoms may carry hydrocarbon radicals as substituent. Preference is given to salts or amides of a polyamine having the formula

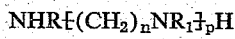

in which the symbols R and $R_1$ represent hydrogen atoms or a saturated or unsaturated aliphatic hydrocarbon group with 1 to 30 carbon atoms, $n$ is a whole number from 2 to 6 and $p$ a whole number from 1 to 10. Examples of these polyamines are the compounds in which the groups R and $R_1$ have 8 to 20 carbon atoms, the value of $n$ being 3 and that of $p$ 1, which polyamines are commercially available. Particular preference is given to salts or amides of tall oil acids and amines of the formula given above, in which R and $R_1$ stand for hydrogen atoms, the value of $n$ being 2 and of $p$ 1 to 6, for instance the polyamine mixture obtained as a by-product in the manufacture of ethylenediamine from 1,2-dihalogenoethane and ammonia and that consists mainly of diethylenetriamine, triethylenetetramine and tetraethylenepentamine.

Salts or amides that have a hydrocarbon group with at least 8 carbon atoms are sufficiently soluble in hydrocarbon oils to be employed in the process according to the invention. One can use either salts or amides of polyamines that have such a hydrocarbon group, or salts or amides of carboxylic acids that have such a hydrocarbon group.

When gasoline or kerosine is used as the base their volatility may constitute a fire risk and therefore their use should be restricted to outdoor work. A mold oil based on gas oil or lubricating oil is preferred for both indoor and outdoor work.

When the material used sets at the temperature of the atmosphere or slightly higher, the application of a mold oil according to the invention, based on gas oil or a gas oil with a slight admixture of spindle oil, is very suitable. If, however, the structures or objects are to set at higher temperatures, for instance at 50–80° C., or if, owing to the dimensions of the structures, high pressures occur in the mold, it is advantageous to use a base oil with a higher viscosity for instance lubricating oil or a mixture of gas oil and lubricating oil consisting predominantly of lubricating oil. Of the lubricating oils, spindle oil in particular is suitable.

The salts or amides may, if desired, be used with other admixtures, such as fatty oils or anti-corrosives, agents to prevent turbidity at low temperatures, such as alcohols, agents inhibiting mist formation when the oil is sprayed, such as polymerized alkenes, and other agents usually added to mold oils.

The mold oil composition can be applied per se or, if desired, as an aqueous emulsion. It can be applied with a paint brush or other brush, by spraying or by any other suitable means, on to the casings, frames or molds.

The invention is particularly suitable for application for making structures or objects that are required to have a smooth and flawless surface, such as ceilings, walls and floors as applied in prefabricated constructions, and which, without undergoing any further treatment, permit of being papered, whitewashed or painted, facing stones, window and door frames, stairs. The invention is also very suitable for making structures or objects that must be easily removable from the mold or frame, as in the manufacture of roof tiles from clay, where it is important for their mechanical production that the tiles, which are pressed from clay between two molds, drop out easily without sticking, or, as in the manufacture of piles, which, if there is any adhesion of the concrete, are very difficult or impossible to remove from the mold owing to their great length, or as in the manufacture of centrifugally poured cement and concrete piping.

The invention is elucidated by the following examples.

*Example I*

The mold oil used in the example was a solution in a mixture of 10 parts by weight of spindle oil with a viscosity of 12 cs. at 50° C. and 90 parts by weight of gas oil, of a salt formed from oleic acid and the diamine R—NH(CH$_2$)$_3$—NH$_2$, in which R is the group

CH$_3$—(CH$_2$)$_7$CH=CH—(CH$_2$)$_8$ in the molar ratio of 2 moles of oleic acid to 1 mole of diamine. The concentration of the salt was 5% by weight. The mold oil was applied in pouring concrete kerbing. The sides of the steel mold were brushed over with the mold oil, after which the concrete was poured into the mold. After a setting time of 12 hours the mold was easily removed, the resultant kerbing having a smooth surface. No concrete had adhered to the inside of the mold.

In a corresponding experiment to make kerbing in which the molds were brushed with a spindle oil containing no admixture, the resultant kerbing had a rough surface and concrete adhered to the sides of the mold and was very difficult to remove.

*Example II*

The mold oil used in this example was a solution in a spindle oil having a viscosity of 12 cs. at 50° C., of a salt of 1 equivalent of technical tall oil acids with an acid value of 2.85 meq. per gram and 1 equivalent of an amide containing amino groups. The concentration of the salt was 2% by weight. To the solution was added 1% by weight of isopropanol. The amide had been obtained from the same technical tall oil acids and a polyamine mixture with the following composition and properties: 2% by weight of ethylenediamine, 10% by weight of diethylenetriamine, 21% by weight of triethylenetetramine and 65% by weight of tetraethylenepentamine and 2% by weight of higher amines, basic nitrogen content (titratable with hydrochloric acid) 26.9 meq. per gram. The amide was obtained by allowing the tall oil acids and the amine mixture to react with each other in the ratio of 0.75 eq. of acid per eq. of amine. The resultant amide contained 0.85 meq. of basic nitrogen per gram.

The mold oil was sprayed on to the sides and bottom plate of a steel frame for manufacturing concrete bridge slabs measuring: height 2.25 meters, length 45 meters and thickness 0.5 meter. The steel frame consisted of a fixed base plate and mobile side panels. After the frame had been assembled and sprayed with the mold oil the reinforcement was fitted in the frame and the concrete was poured in. While the concrete was being poured in, the mix was caused to vibrate by vibration motors fitted to the side of the frame at a level of one third of the height from the bottom. After the frame had been two thirds filled the vibration motors were raised to two thirds of the height of the side panel. When the concrete had been poured in the frame was covered with a tarpaulin and steam was passed through a steam line attached to the sides of the frame. When steam has been passed through for 12 hours, the temperature of the concrete having risen to 60° C., the frame was removed. No concrete was found on the sides or bottom of the frame, the bridge slab was easily removed from the base plate without any difficulty and without causing any damage to the slab, the surface of which was perfectly smooth and flawless.

When the spindle oil was used without the additive it was not possible to produce a similar slab with a flawless surface, owing to adhesion of concrete to the steel frame; cleaning the frame took 8 man hours more than when the mold oil according to the invention was applied.

*Example III*

The mold oil used in this example contained the amide obtained from technical tall oil acids having an acid value of 2.85 meq. per gram and the amine mixture described in Example II with 26.9 meq. of basic nitrogen per gram. The nitrogen content of the amide was 9.5% by weight. The base oil was a mixture of 91.8 parts by weight of gas oil and 8.2 parts by weight of spindle oil with a viscosity of 12 cs. at 50° C., to which 1% by weight of isopropanol had been added. The concentration of the amide was 2% by weight.

This mold oil was applied in mechanical masonry work. A cast-iron matrix measuring 2.75 by 1.75 m. was wetted with the mold oil by means of an atomizer. Then bricks were placed in position along the long side of the matrix. The wall section consisting of loose bricks thus obtained was covered with an even layer of mortar and the matrix was then vibrated, as a result of which the mortar flowed down between the bricks. The upper side of the wall section was then covered with mortar. After setting for 24 hours in a drying chamber, where a temperature of 35–40° C. was maintaned, the wall section was easily removed from the matrix without any damage to the joints.

When a mixture of gas oil and spindle oil mixed in the same ratio of 91.8:8.2 but without any additive was used, or a gas oil or spindle oil without the additive, it was not possible to remove the section without large fragments of the joints adhering to the matrix. Also a mold oil consisting of 98 parts by weight of gas oil and 2 parts by weight of oleic acid failed to give a satisfactory result, because the joints of the wall section were damaged during removal.

It is apparent that many modifications and variations of the invention as hereinbefore set forth may be made without departing from the spirit and scope thereof. The examples given are by way of illustration only and the invention is limited only by the terms of the appended claims.

I claim as my invention:

1. In a process for making molded mortar-containing objects, the improvement which comprises coating the molds used in the process with a liquid oleaginous base containing from about 0.1% to about 10% of a derivative of a polyamine and an organic acid, said derivative being selected from the group consisting of an amine salt of a polyamine and an organic carboxylic acid and an amide of a polyamine and an oganic carboxylic acid, which derivative contains a hydrocarbon group of at least 8 carbon atoms in the molecule.

2. In a process for making molded mortar-containing building articles of manufacture, the improvement which comprises coating the molds used in the process with a liquid hydrocarbon base containing from about 0.1% to about 10% of a salt of polyamine having an alkyl radical of at least 8 carbon atoms and an aliphatic carboxylic acid.

3. In a process for making molded mortar-containing building articles of manufacture, the improvement which comprises coating the molds used in the process with a liquid hydrocarbon base containing from about 0.1% to about 10% of an amide of polyamine having an alkyl radical of at least 8 carbon atoms and an aliphatic carboxylic acid.

4. In a process for making molded mortar-containing building articles of manufacture, the improvement which comprises coating the molds used in the process with a liquid hydrocarbon base containing from about 0.1% to about 10% of a salt of polyamine and an aliphatic carboxylic acid having at least 8 carbon atoms.

5. In a process for making molded mortar-containing building articles of manufacture, the improvement which comprises coating the molds used in the process with a liquid hydrocarbon base containing from about 0.1% to about 10% of an amide of polyamine and an aliphatic carboxylic acid having at least 8 carbon atoms.

6. In a process for making molded mortar-containing building articles of manufacture, the improvement which comprises coating the molds used in the process with a liquid hydrocarbon base containing from about 0.1% to about 10% of a salt of polyamine having an alkyl radical of at least 8 carbon atoms and oleic acid.

7. In a process for making molded mortar-containing building articles of manufacture, the improvement which comprises coating the molds used in the process with a liquid hydrocarbon base containing from about 0.1% to about 10% of a salt of polyamine having an alkyl radical of at least 8 carbon atoms and tall oil acid.

8. In a process for making molded mortar-containing building articles of manufacture, the improvement which comprises coating the molds used in the process with a liquid hydrocarbon base containing from about 0.1% to about 10% of a salt of polyamine having an alkyl radical of at least 8 carbon atoms and sebacic acid.

9. In a process for making molded mortar-containing building articles of manufacture, the improvement which comprises coating the molds used in the process with a liquid hydrocarbon base containing from about 0.1% to about 10% of an amide of polyamine having an alkyl radical of at least 8 carbon atoms and oleic acid.

10. In a process for making molded mortar-containing building articles of manufacture, the improvement which comprises coating the molds used in the process with a liquid hydrocarbon base containing from about 0.1% to about 10% of an amide of polyamine having an alkyl radical of at least 8 carbon atoms and tall oil acid.

References Cited by the Examiner

UNITED STATES PATENTS

| | | | |
|---|---|---|---|
| 22,739 | 1/59 | Meucci | 117—5.1 |
| 2,241,594 | 5/41 | Gray et al. | 117—5.1 |
| 2,736,658 | 2/56 | Pfohl et al. | 117—134 XR |
| 2,785,078 | 3/57 | Keating et al. | 117—97 XR |
| 2,937,950 | 5/60 | Tillman | 117—5.1 XR |

RICHARD D. NEVIUS, *Primary Examiner.*